United States Patent [19]
Moore

[11] 3,842,923
[45] Oct. 22, 1974

[54] OVERHEAD TRACK SCALE

[75] Inventor: Fred Lahira Moore, Petaluma, Calif.

[73] Assignee: National Controls, Inc., Santa Rosa, Calif.

[22] Filed: Nov. 15, 1973

[21] Appl. No.: 416,187

[52] U.S. Cl. ............................... 177/163, 177/220
[51] Int. Cl. ..................... G01g 21/22, G01g 23/26
[58] Field of Search ............................ 177/163, 220

[56] References Cited
UNITED STATES PATENTS
998,540    7/1911    Manes................................ 177/163
3,477,533  11/1969   Hyer et al......................... 177/220

Primary Examiner—George H. Miller, Jr.
Attorney, Agent, or Firm—Flehr, Hohbach, Test, Albritton & Herbert

[57] ABSTRACT

Overhead track scale for determining the weight of loads carried by an overhead rail. The scale includes a pair of in-line levers and flexure plates for transmitting forces exerted by a load from the rail to the levers. The levers apply the forces to an output transducer which provides an output signal corresponding to the weight of the load. This signal is processed and displayed at a convenient location.

7 Claims, 4 Drawing Figures

OVERHEAD TRACK SCALE

BACKGROUND OF THE INVENTION

This invention pertains generally to weighing apparatus and more particularly to an overhead track scale.

Certain types of conveyors, hoists and other apparatus heretofore provided utilize overhead rails or tracks to support a load to be conveyed or lifted. The load is generally suspended from a trolley or carriage which runs on the track. The invention provides a new and improved scale for determining the weight of the load carried by the overhead track.

SUMMARY AND OBJECTS OF THE INVENTION

The track scale of the invention has a pair of in-line levers and flexure plates for transmitting forces exerted by a load from the rail to the levers. The levers apply the forces to an output transducer which provides an output signal corresponding to the weight of the load. This signal is processed and displayed at a convenient location.

It is in general an object of the invention to provide a new and improved overhead track scale.

Another object of the invention is to provide an overhead track scale of the foregoing character utilizing flexure plates in its lever system.

Another object of the invention is to provide an overhead track scale of the above character which includes an electrical load cell and means for providing a digital display of the weight of a load.

Additional objects and features of the invention will be apparent from the following description in which the preferred embodiment is set forth in detail in conjunction with the accompanying drawings.

DESCRIPTION OF THE PREFERRED EMBODIMENT

Figure 1:
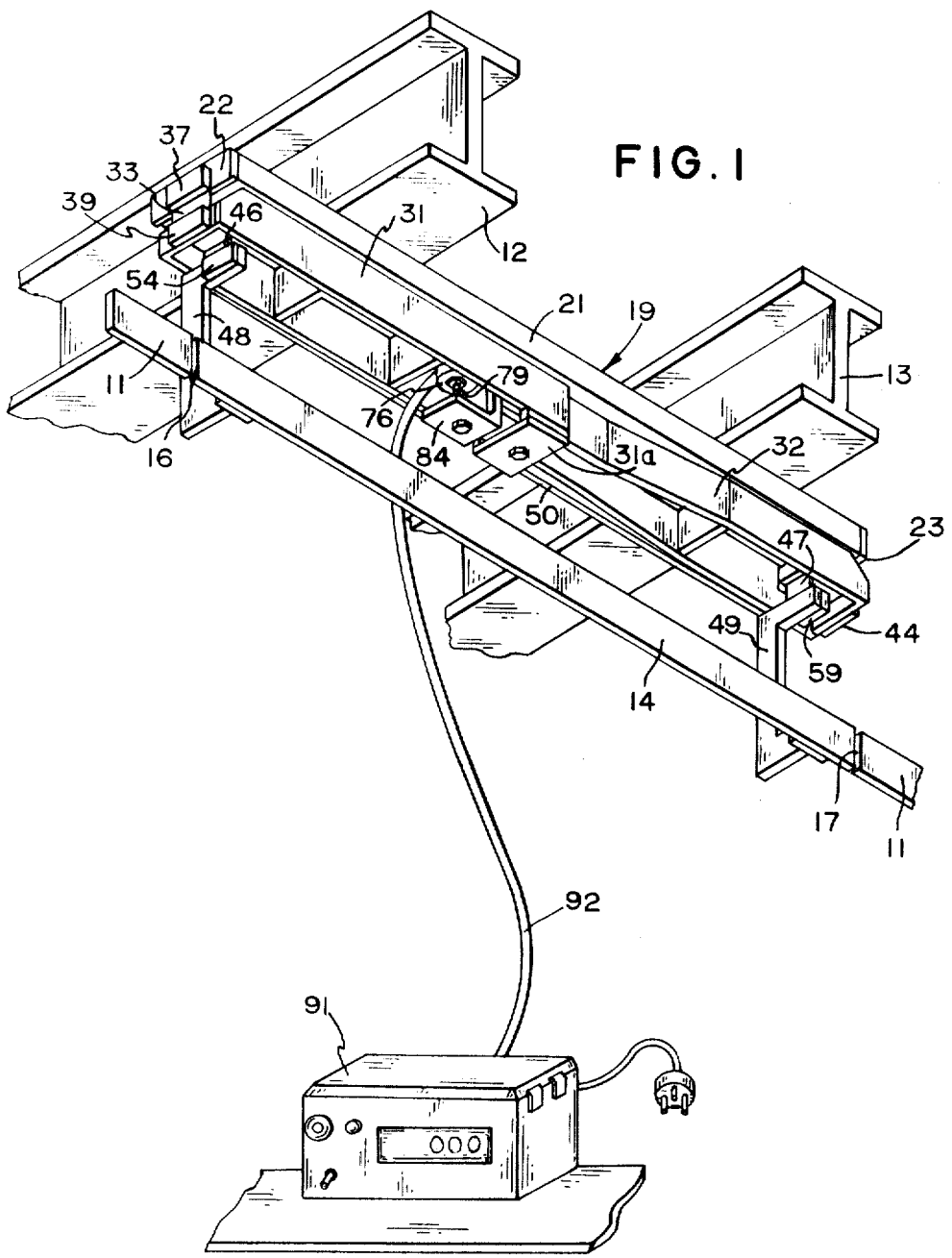
FIG. 1 is a perspective view of one embodiment of an overhead track scale according to the invention.
Figure 2:
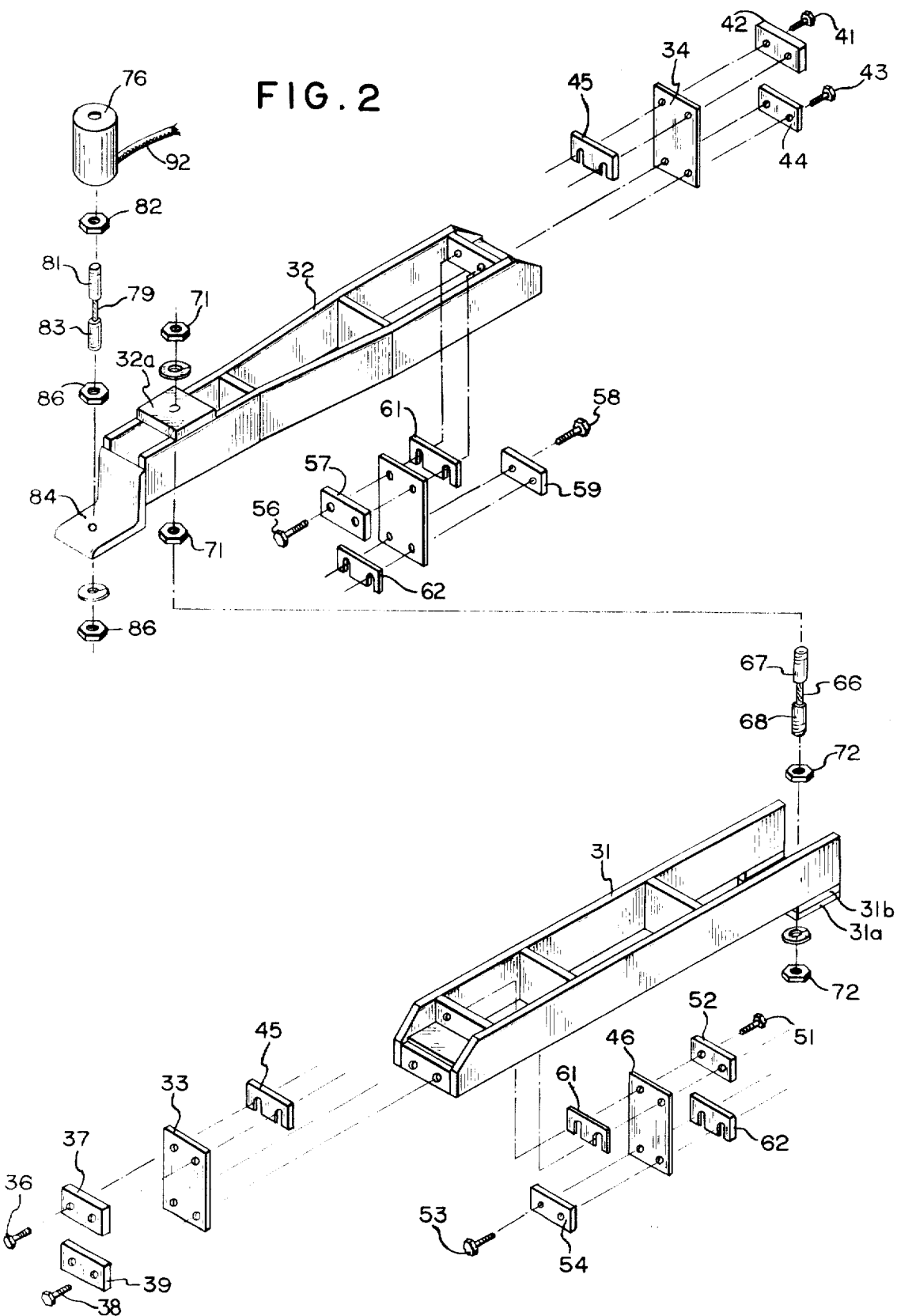
FIG. 2 is an exploded perspective view of the lever system of the overhead track scale shown in FIG. 1.
Figure 3:
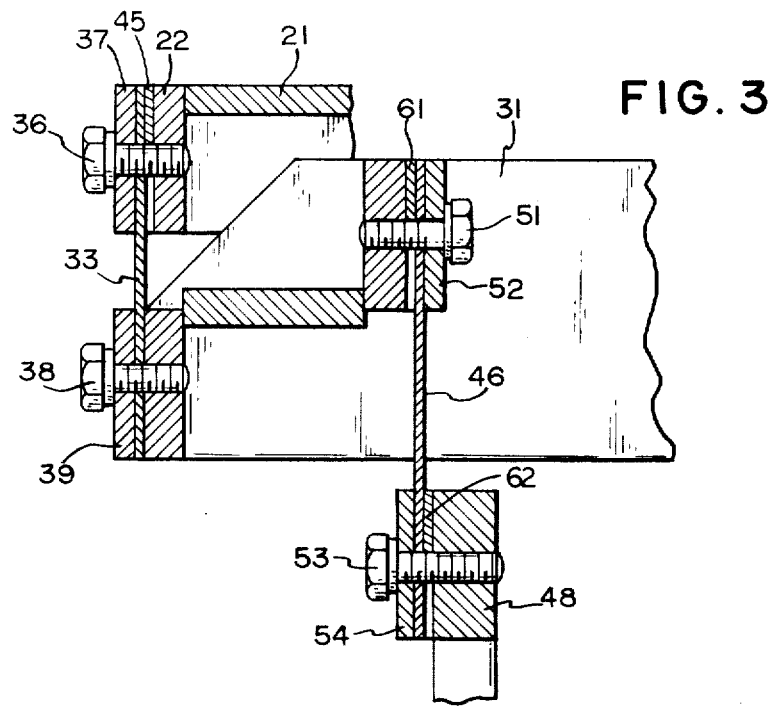
FIG. 3 is a fragmentary sectional view of the left end portion of the scale shown in FIG. 1.
Figure 4:
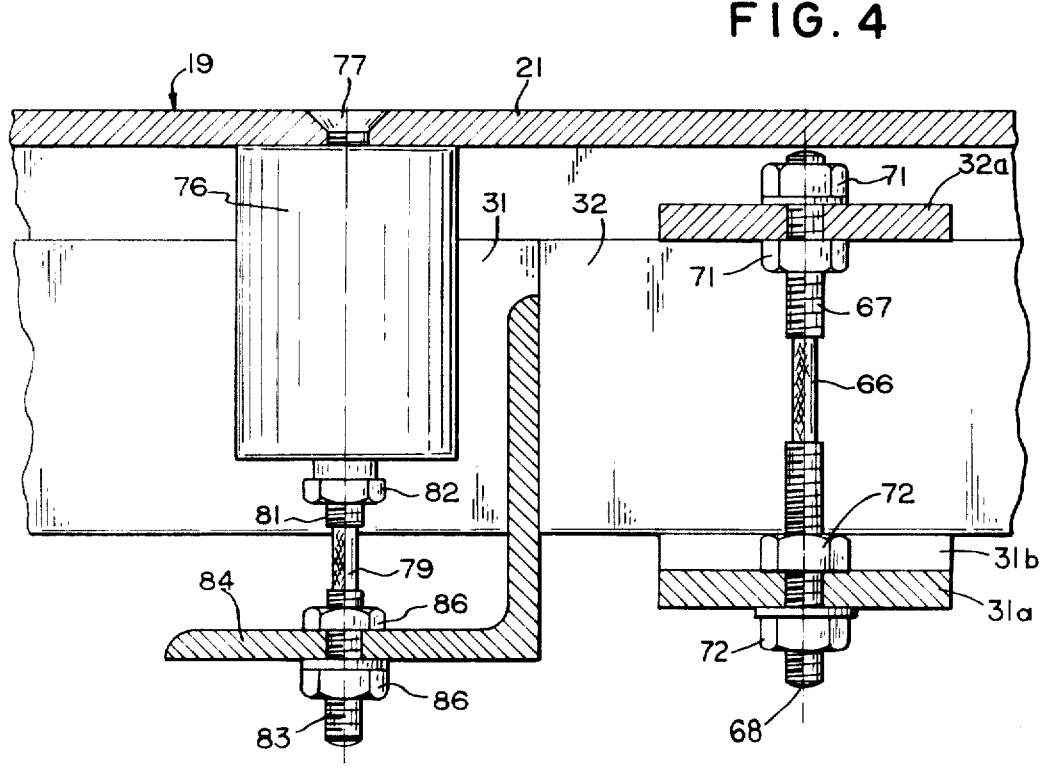
FIG. 4 is a fragmentary sectional view of the central portion of the scale shown in FIG. 1.

In the drawings, the track scale is illustrated in connection with an overhead track 11 which is supported from suitable overhead structure, such as I-beams 12 and 13, in a conventional manner. A section of the track is replaced by a rail 14 which forms a part of the scale. This rail is aligned with the remainder of the track to permit a trolley or other load carrying vehicle to roll freely between the rail and the remainder of the track. Narrow gaps 16 and 17 are provided between the ends of rail 14 and the remainder of the track to isolate the rail from the track.

The scale includes a base 19 which, in the preferred embodiment, comprises an elongated U-shaped channel member 21 having end plates 22 and 23 affixed to the ends thereof. The base is mounted on a suitable overhead support, such as I-beams 12 and 13, by suitable means such as bolts or welding.

A pair of axially aligned elongated levers 31 and 32 are supported from base 19. These levers extend in a direction generally parallel to rail 14, and their inner or proximate ends overlap as illustrated. The outer or remote ends of the levers are connected to the end plates of the base by vertically extending flexure plates 33 and 34. The flexure plates are generally rectangular in shape, and they are fabricated of a flexible material such as a steel alloy. The upper portion of flexure plate 33 is secured to end plate 22 by bolts 36 and a clamping plate 37, and the lower portion of the flexure plate is secured to the end of lever 31 by bolts 38 and a clamping plate 39. Similarly, the upper portion of flexure plate 34 is secured to end plate 23 by bolts 41 and a clamping plate 42, and the lower portion of this flexure plate is secured to the end of lever 32 by bolts 43 and a clamping plate 44. Shims 45 are used if necessary to assure proper alignment of flexure plates 33 and 34 and to adjust and equalize the effective lengths of levers 31 and 32 to provide the desired lever ratio.

Rail 14 is connected to the outer ends of levers 31 and 32 by flexure plates 46 and 47 and C-shaped hanger brackets 48 and 49. These flexure plates are similar in construction to flexure plates 33 and 34, and they are spaced from and generally parallel to flexure plates 33 and 34. The upper portion of fexure plate 46 is secured to the pivot head portion of lever 31 by means of bolts 51 and a clamping plate 52, and the lower portion of this flexure plate is secured to the upper arm of hanger bracket 48 by bolts 53 and a clamping plate 54. Similarly, the upper portion of flexure plate 47 is secured to the pivot head portion of lever 32 by bolts 56 and a clamping plate 57, and the lower portion of this flexure plate is secured to the upper arm of hanger bracket 49 by bolts 58 and a clamping plate 59. Shims 61 and 62 are used as needed to assure proper alignment of flexure plates 46 and 47 and to adjust and equalize the effective lengths of levers 31 and 32 to provide the desired lever ratio. The lower arms of hanger brackets 48 and 49 are affixed to rail 14 by suitable means such as welding, and a check link or stabilizer rod 50 is connected between the upper portions of the hanger brackets and grounded to base 19.

As illustrated, hanger brackets 48 and 49 are mounted inwardly of flexure plates 46 and 47, although they can be mounted on the outer sides of these flexure plates, if desired. The position illustrated is the preferred position, and it permits the pivot head portions of the levers to be made shorter, with flexure plates 46 and 47 closer to flexure plates 33 and 34, thereby permitting a higher lever ratio.

The inner or free ends of levers 31 and 32 which overlap each other are connected together by means of a flexible cable 66 having threaded studs 67 and 68 affixed to its ends. The upper end of the cable is attached to a crossarm 32a on lever 32 by nuts 71 and stud 67, and the lower end of the cable is attached to a crossarm 31a on lever 31 by nuts 72 on studs 68. The nuts permit the effective length of the cable to be adjusted as desired. Crossarm 31a is offset below the remainder of lever 31 by spacers 31b to provide clearance between the crossarm and the lower portion of lever 32 to permit the levers to move freely in response to loads on rail 14. In the preferred embodiment, cable 66 is disposed on the centerline of the lever system.

An output transducer 76 is mounted toward the center of base 19 by suitable means such as a screw 77. In the embodiment illustrated, the output transducer is an electrical load cell which produces an electrical signal corresponding to the tensive force applied thereto. Alternatively, other types of output transducers, such as a hydraulic load cell, can be utilized instead of the electrical load cell. Likewise, if desired, a compressive load cell can be mounted below the levers in the embodiment shown.

The free end of lever 32 is connected to transducer 76 by a flexible cable 79. A threaded stud 81 is affixed to the upper end of this cable, and the stud is threadedly connected to the transducer and secured by a jam nut 82. A second threaded stud 83 is affixed to the lower end of cable 79 and attached t0 an L-shaped bracket 84 at the inner end of lever 32 by nuts 86. The tension in cable 79 can be adjusted by nuts 86.

A signal processing and display unit 91 is connected to output transducer 76 by an electrical cable 92. The cable is of sufficient length to permit the unit to be located at a convenient location away from the remainder of the scale. Unit 91 contains suitable circuitry for processing the output signal from transducer 76 to provide a digital display of the weight of a load on rail 14. A particularly suitable processing and display system which permits tare weight to be automatically subjected to display net weight is described in co-pending application Ser. NO. 273,415, filed July 20, 1972 and assigned to the assignee herein.

Operation and use of the track scale can be described briefly. The trolley or other vehicle carrying a load to be weighed is moved onto rail 14. The load exerts a downward force on the rail, and this force is transmitted by the flexure plates to levers 31 and 32, producing a downward force at the free ends of the levers. The latter force is transmitted to load cell 76 by flexible cable 79, producing an output signal corresponding to the weight of the load. This signal is processed by unit 91 to provide a digital display of the weight.

It will be noted that flexure plates 46 and 47, from which hanger brackets 48 and 49 and rail 14 are suspended, are disposed inwardly of flexure plates 33 and 34 which support the ends of the lever arms. With this arrangement, the levers are second class levers, and a downward force on rail 14 produces a downward force at the free ends of the levers. Alternatively, if desired, flexure plates 46 and 47 can be located outside flexure plates 33 and 34, in which case a downward force on rail 14 will produce an upward force at the free ends of the levers. With first class levers, crossarm 31a and spacers 31b would be moved to the top of lever 31, crossarm 32a would be moved to the bottom of lever 32, and transducer 76 would either be replaced with a compressive load cell or it would be mounted below the levers.

It is apparent from the foregoing that a new and improved overhead track scale has been provided. While only the presently preferred embodiment has been described, as will be apparent to those familiar with the art, certain changes and modifications can be made without departing from the scope of the invention as defined by the following claims.

I claim:

1. In a scale for weighing a load carried by an overhead track, a base adapted to be mounted on an overhead support such as the structure from which the track is suspended, a pair of axially aligned elongated levers extending in a direction generally parallel to the track, first generally planar vertically extending flexure plates connecting the remote ends of the levers to the base, second generally planar flexure plates spaced from and generally parallel to the first flexure plates, the upper portions of the second flexure plates being affixed to the remote ends of the levers, depending hanger brackets affixed to the lower portions of the second flexure plates, a rail carried by the hanger brackets adapted to replace a section of the overhead track when the scale is installed whereby a load can be moved freely between the rail and the remainder of the track, flexible means connecting the proximate ends of the levers together, an output transducer carried by the base for delivering an output signal corresponding to the force applied thereto, and means connecting the proximate end of one of the levers to the output transducer.

2. A scale as in claim 1 wherein the output transducer comprises a load cell which provides an electrical output signal.

3. A scale as in claim 1 further including weight display means connected to the output transducer and located remotely of the remainder of the scale.

4. A scale as in claim 1 wherein the second flexure plates are located inwardly of the first flexure plates whereby a load suspended from the rail produces a downward force at the proximate ends of the levers.

5. A scale as in claim 4 wherein the means connecting the end of one lever to the output transducer comprises a flexible cable.

6. In an overhead track scale, an elongated rail, a base adapted to be mounted on an overhead support, a pair of levers, means including generally planar flexure plates interconnecting the rail, base and one end of each lever in such manner that the rail is suspended below the base and a load applied to the rail produces a force corresponding to the load at the free ends of the levers, an output transducer for delivering an output signal corresponding to the force applied thereto, and means connecting the free ends of the levers to the transducer.

7. An overhead track scale as defined by claim 6 further including digital display means connected electrically to the transducer and located remotely of the remainder of the scale.

* * * * *